(12) United States Patent
Thorvardarson et al.

(10) Patent No.: US 7,748,349 B2
(45) Date of Patent: Jul. 6, 2010

(54) SUBMERSIBLE CAGE AND SYSTEM FOR FISH FARMING

(75) Inventors: Jon Thorvardarson, Kopavogur (IS); Luke Aymar, New Brunswick (CA); Prasad Bodhani, New Brunswick (CA); Edwin Elrick, New Brunswick (CA); Rick Grant, New Brunswick (CA); Thomas Mathieson, New Brunswick (CA); Christopher Saulnier, New Brunswick (CA); Andrew Storey, New Brunswick (CA)

(73) Assignee: Open Ocean Systems, Inc., New Brunswick (CA)

( * ) Notice: Subject to any disclaimer, the term of this patent is extended or adjusted under 35 U.S.C. 154(b) by 485 days.

(21) Appl. No.: 11/559,058

(22) Filed: Nov. 13, 2006

(65) Prior Publication Data

US 2008/0110408 A1    May 15, 2008

(51) Int. Cl.
*A01K 63/04* (2006.01)
(52) U.S. Cl. ...................................... 119/223; 119/232
(58) Field of Classification Search ............... 119/208, 119/223, 232, 239, 264, 215, 226; 134/22.18, 134/24, 167 R, 180
See application file for complete search history.

(56) References Cited

U.S. PATENT DOCUMENTS

| | | | | |
|---|---|---|---|---|
| 3,653,358 A * | 4/1972 | Fremont | ..................... | 119/223 |
| 3,698,359 A * | 10/1972 | Fremont | ..................... | 119/223 |
| 3,886,902 A * | 6/1975 | Haynes | ..................... | 119/224 |
| 4,252,081 A * | 2/1981 | Smith | ..................... | 119/223 |
| 4,257,350 A * | 3/1981 | Streichenberger | ..................... | 119/223 |
| 4,725,353 A * | 2/1988 | Whitman | ..................... | 210/167.23 |
| 5,521,571 A | 5/1996 | Laskaris et al. | | |
| 5,713,303 A * | 2/1998 | Willinsky et al. | ..................... | 119/218 |
| 5,967,086 A * | 10/1999 | Knott, Sr. | ..................... | 119/223 |
| 6,216,635 B1 * | 4/2001 | McRobert | ..................... | 119/201 |
| 6,279,187 B1 * | 8/2001 | Herrington et al. | ..................... | 15/1.7 |
| 2002/0144714 A1* | 10/2002 | McCasker | ..................... | 134/22.18 |
| 2006/0096548 A1 | 5/2006 | Ytterland et al. | | |

FOREIGN PATENT DOCUMENTS

| | | |
|---|---|---|
| FR | 2 408 302 A1 | 6/1979 |
| FR | 2 420 920 A1 | 10/1979 |
| GB | 2 031 251 | 4/1980 |
| WO | WO 82 03152 A1 | 9/1982 |
| WO | WO 92/03921 A1 | 3/1992 |
| WO | WO 2004/073396 A1 | 9/2004 |

* cited by examiner

*Primary Examiner*—Rob Swiatek
*Assistant Examiner*—Kristen C Hayes
(74) *Attorney, Agent, or Firm*—Sughrue Mion, PLLC

(57) ABSTRACT

A submersible rotatable cage for fish farming comprises a central axle, a buoyant structure positioned about the central, a netting attached to the buoyant structure and an actuator in operable communication with at least part of the buoyant structure and adapted to facilitate rotation of the buoyant structure about the central axle while the cage is in a submerged position. The cage can form part of a system, which includes a net cleaning apparatus, a tethering mechanism and sweep net, that can be used for nearly complete underwater fish farming.

7 Claims, 16 Drawing Sheets

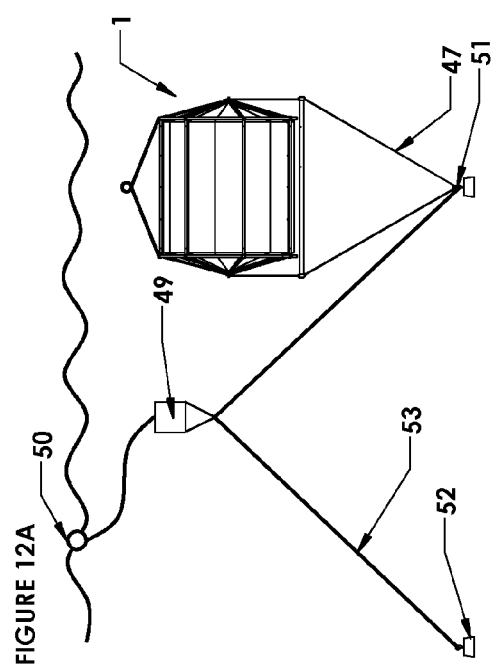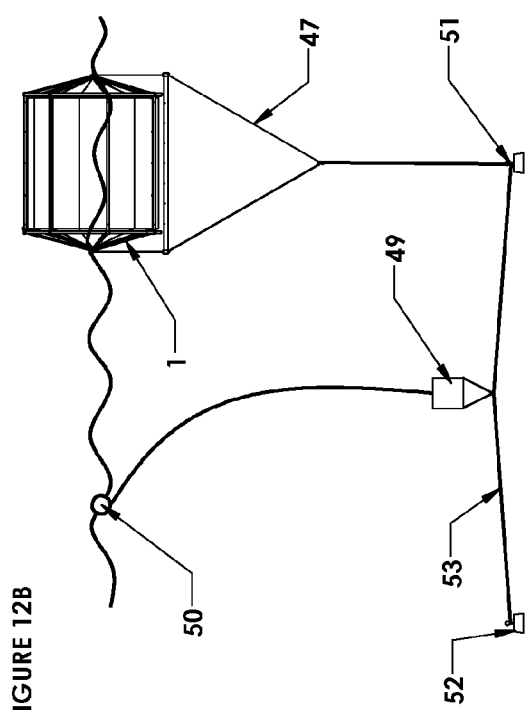

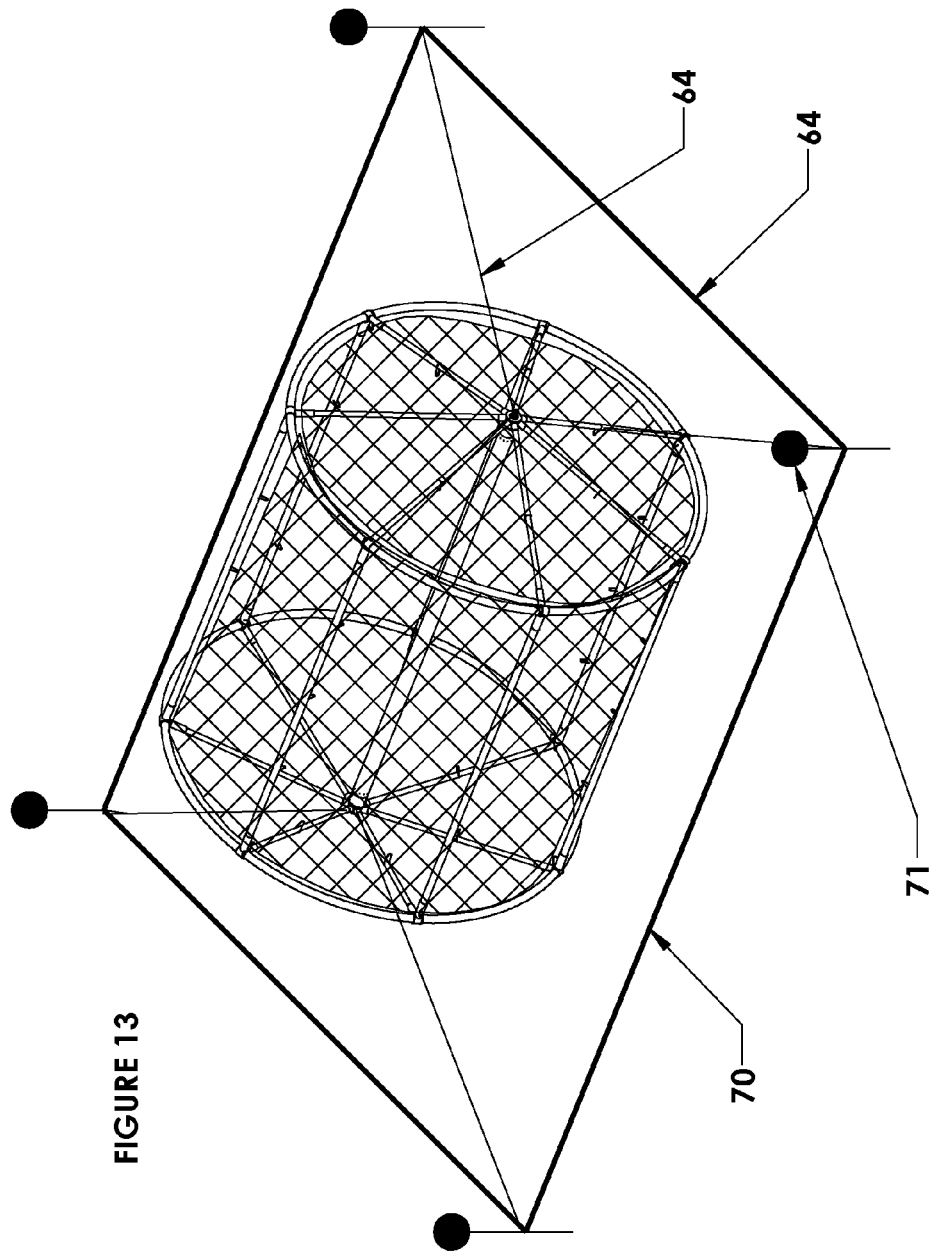

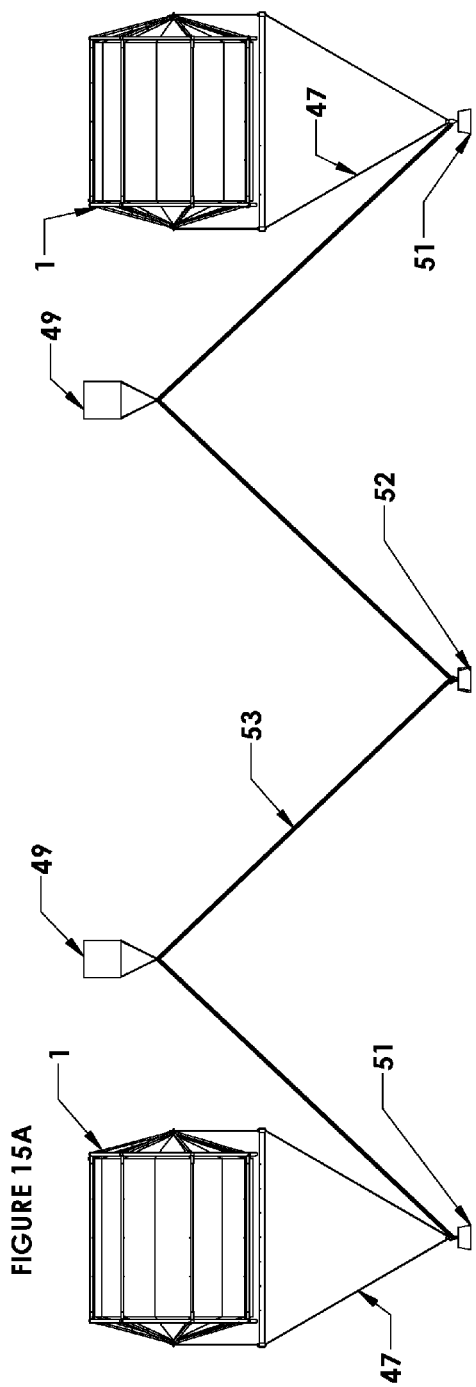
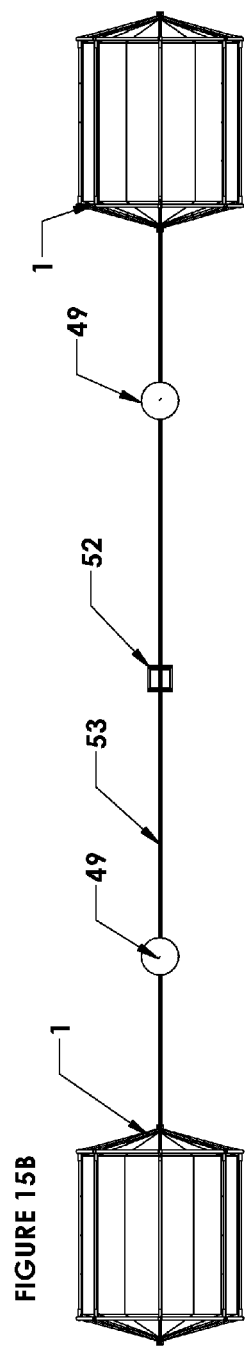
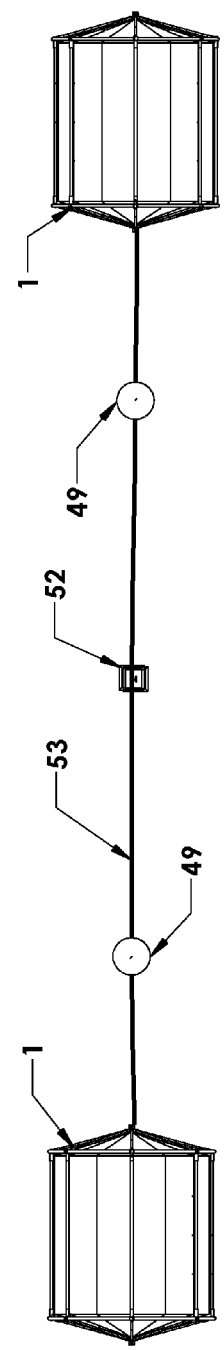
FIGURE 15A
FIGURE 15B

SUBMERSIBLE CAGE AND SYSTEM FOR FISH FARMING

FIELD OF THE INVENTION

The present invention generally relates to a cage a system for fish farming. More specifically, the present invention relates to a submersible rotatable cage and system for the nearly complete underwater fish farming.

BACKGROUND OF THE INVENTION

Fish farming is an industry growing at a rapid rate, which is driven by the demand for increased quantities of food resources and the decrease of natural sources of fish in lakes and oceans. Fish farming usually involves floating cages, which are positioned just offshore in fjords, seas, lakes or other natural bodies of water. The fish cages are usually wide cages comprising a rigid cylindrical frame structure positioned horizontally on the surface of the body of water and a net system allowing water to flow into and out of the cage. The net system is made with net meshes of sufficiently small size to retain the fish inside the cage. Such conventional cages typically have a circular bottom net, a cylindrical sidewall net extending to the water surface and an open top end, which may also be covered by a net.

In the most common setup for fish farming plants, a number of floating net cages are anchored close to shore using buoys and weights to stabilize the cages in the water. An optimal installation for fish farms of this sort is in sheltered waters such as bays and fjords and these setups often comprise support frames with gangways for operational purposes, such as maintenance and feeding.

Surface cages, however, are sensitive to severe weather conditions, such as high winds, waves and ice, which can be a serious threat in northern areas. Submersible cages have been suggested and tested. However, these types of cages have not become commercially feasible due to problems with stability and handling.

For example, PCT Publication No. WO 82/03152 to Rene describes a semi-submersible rotatable cage having two or more rings encircling a horizontal central axle. Wire rigging attaches each of the rings and a netting in place over top of the rigging to form a cylindrical cage structure. The cage is rotated while semi-submerged by the systemic inflation of a plurality of buoyancy elements, such as balloons. Since the cage relies on the structural integrity of the netting and the wire rigging to maintain the shape and structure of the cage, damage to either the netting or wire rigging can result in catastrophic structural failure to the cage.

French Patent Application No. 2420920 to Arin also describes a submersible rotatable cage having two or more parallel circular floats that may be connected by a plurality of bars, thereby forming a cylindrical frame. Water and/or air may be introduced into one or more quadrants of the circular floats in a controlled manner to affect the buoyancy of the cage and allow rotation of the cage when partially submerged. The filling of the circular floats with water and/or air using quadrants results in a sporadic rotation of the cage, which can cause undue stress to the inhabitants of the cage as well as the frame itself.

Accordingly, there is a need for a simple, robust, durable and commercially practical cage for cultivating marine animals, which is easy to manufacture and install and can be maintained underwater and readily manipulated to allow for the collection of animals, sorting of animals and maintenance of the cage.

SUMMARY OF THE INVENTION

It is an object of the present invention to provide a submersible cage and system for fish farming which addresses the limitations of the prior art.

According to one aspect of the present invention, there is provided a submersible cage for aquaculture comprising: a central axle; a buoyant structure having a first wheel positioned at one end of the central axle and a second wheel positioned at the other end of the central axle wherein a plurality of partially hollow cross members connect the first wheel to the second wheel; and a netting attached to the inside of the buoyant structure. A actuator is provided in operable communication with at least part of the buoyant structure and adapted to facilitate rotation of the buoyant structure about the central axle while in the submerged position.

According to another aspect of the present invention, there is provided a system for aquaculture in a submerged cage. The system comprising: a submersible cage comprising: a central axle; a buoyant structure having a first wheel positioned at one end of the central axle and a second wheel positioned at the other end of the central axle wherein a plurality of partially hollow cross members connect the first wheel to the second wheel; and a netting attached to the inside of the buoyant structure; wherein an actuator is in operable communication with at least part of the buoyant structure and adapted to facilitate rotation of the buoyant structure about the central axle while in the submerged position; and tethering means, comprising: a sling positioned outside the buoyant structure and connected to points on either end of the central axle a tethering line is attached at one end to the sling passing through a pulley affixed to the sea bed and attached at the other end to a mooring, wherein a buoyant element is positioned along the tethering line between the pulley and the mooring point to control the vertical positioning of the submersible cage with respect to the sea bed.

According to a further aspect of the present invention, there is provided a device for cleaning of the netting of a cage having a central axle. The device comprising: a positively buoyant arm extending radially from the central axle toward the netting; and a partially hollow cross-member attached to the arm and extending generally parallel to the central axle. A plurality of apertures are positioned along the cross-member to allow expulsion of air or fluid from the cross-member towards the netting.

According to another aspect of the present invention the method of fish farming wherein the fish are removed from the submersible by either a removable panel in the netting or by vacuum through the central axle.

According to yet another aspect of the present invention, there is provided a submersible cage equipped with a trapping entrance for entrapping marine animals. The trapping entrance being substantially funnel-shaped such that animals substantially above a desired size that have entered the cage cannot readily exit the cage through the trapping entrance.

DETAILED DESCRIPTION OF THE DRAWINGS

FIG. 12 shows the submersible cage in the A) submerged position and B) surfaced position according to another embodiment of the present invention;

FIG. 13 shows a possible mooring arrangement for the submersible cage according to an embodiment of the present invention;

FIG. 15 shows a A) side elevation view and B) top plan view of a possible arrangement for the submersible cages of the present invention in a fish farm;

DETAILED DESCRIPTION OF THE INVENTION

The following description is of a preferred embodiment by way of example only and without limitation to the combination of features necessary for carrying the invention into effect.

Figure 1:
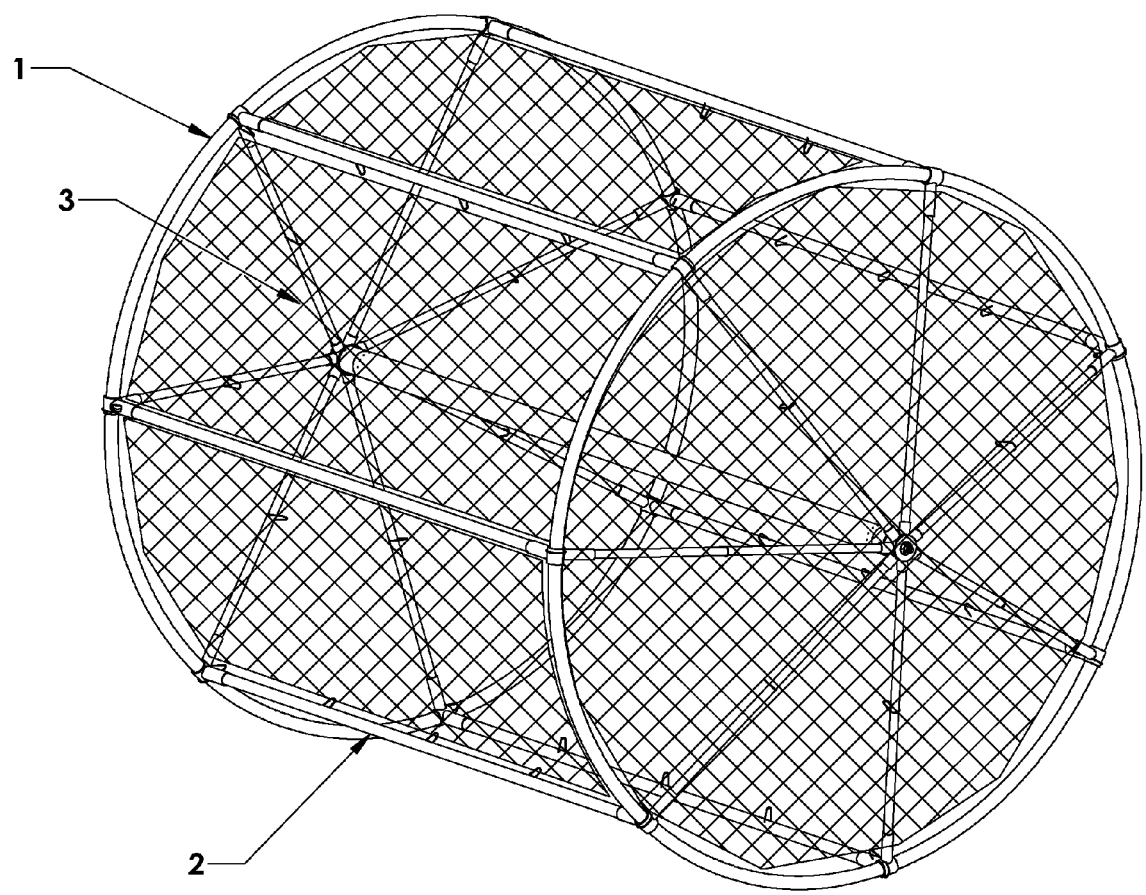
FIG. 1 is a perspective view of the submersible cage of the present invention.
Figure 2:
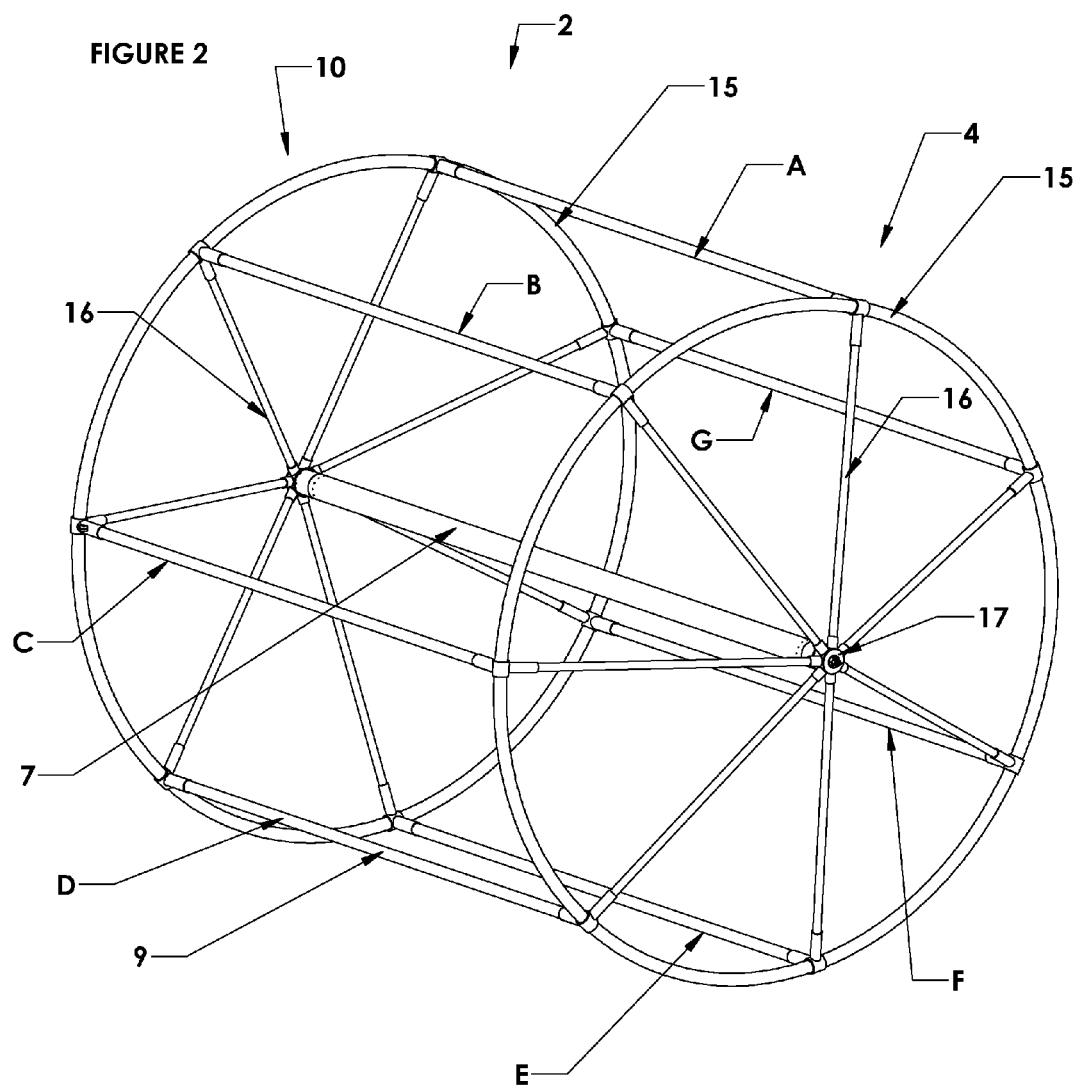
FIG. 2 is a perspective view of the buoyant structure of the present invention.

As illustrated in FIG. 1, the submersible cage (1) for aquaculture comprises a central axle (7), a buoyant structure (2) and a netting (3). As shown in FIG. 2, the buoyant structure (2) has a first wheel (4) positioned at one end of the central axle (7) and a second wheel (10) positioned at the other end of the central axle (7). A plurality of partially hollow cross-members (9) connect the first wheel (4) to the second wheel (10).

Description of the structure and function of the wheels (4, 10) will be provided using the first wheel (4) as an example. However, it will be readily understood by those skilled in the art that the second wheel (10) will have a similar structure and function. As shown in FIG. 2, the first wheel (4) can comprise a partially hollow rim (15) connected to hub assembly (17) by a plurality of spokes (16).

Alternatively, the spokes (16) can be connected at one end to the hub assembly (17) and at the end to the cross-members (9) near the intersection between the partially hollow rim (15) and cross-member (9). At least some of the spokes (16) can be partially hollow in order to allow controlled adjustment of the buoyancy thereof. The partially hollow rim (15) can be filled with a gas or liquid to adjust the buoyancy of the structure (2). For example, vents or nozzles can be connected to hoses or pressurized cylinders to allow for remote controlled injection of gas or liquid into the partially hollow rim (15). When hoses are connected to the partially hollow rim (15) swivel connections should be used to prevent the twisting of the hoses when the wheels (4, 10) are rotated.

Figure 3:
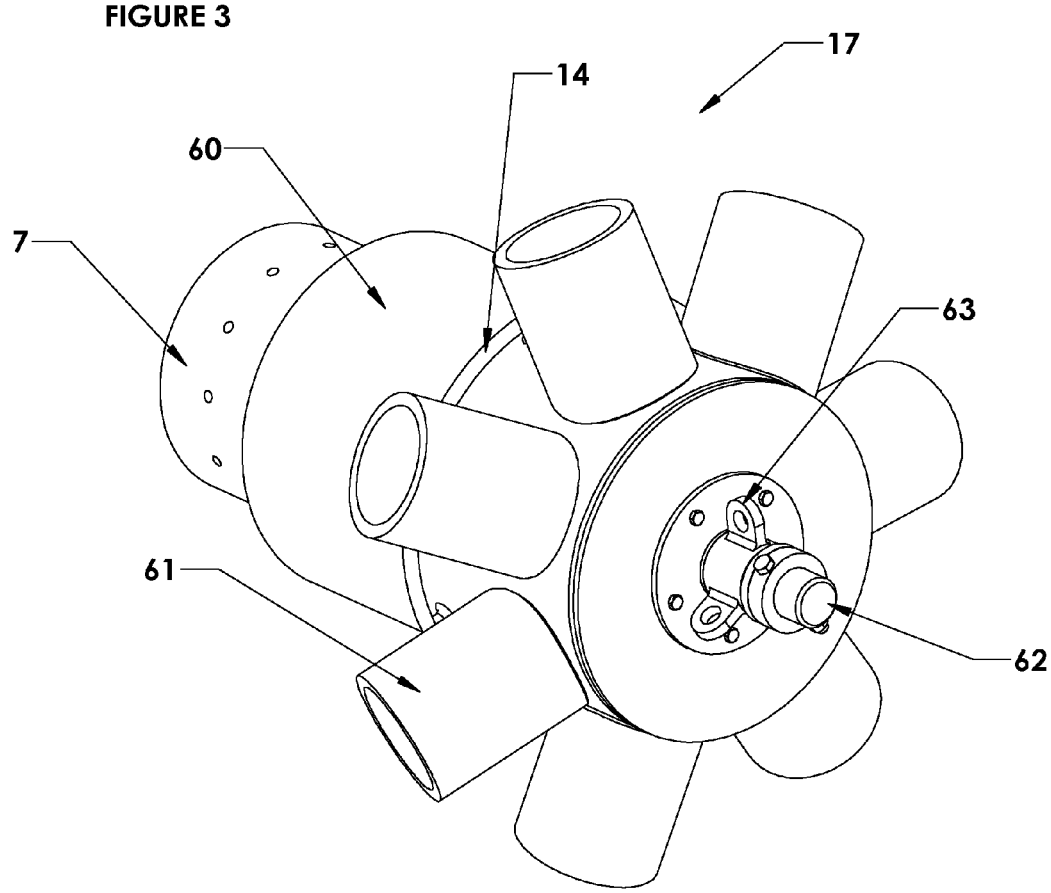
FIG. 3 is a perspective view of the hub assembly of the present invention.

As illustrated in FIG. 3, the hub assembly (17) comprises an outer sleeve (60) that at least partially encircles the central axle (7), a series of support points (61) for the spokes (16) and a hub axle (62). The hub axle (62) is arranged to function as a stabilizing and alignment tool, with an outer bearing attachment point (63) for the mooring lines (64) and/or sling (47) which allows the cage (1) to rotate, and to act as the main entry point for which services and materials can be introduced to the interior of the netting (3). The hub assembly (17) is meant to be interchangeable to allow for maintenance, upgradeability and to permit for the introduction of new functionalities.

In certain circumstances, such as extremely harsh environments, it may be advantageous to provide additional wheels (not shown) along the central axle (7) to increase the overall stability of the submersible cage (1) and assist in the rotation of the cage (1).

Figure 4:
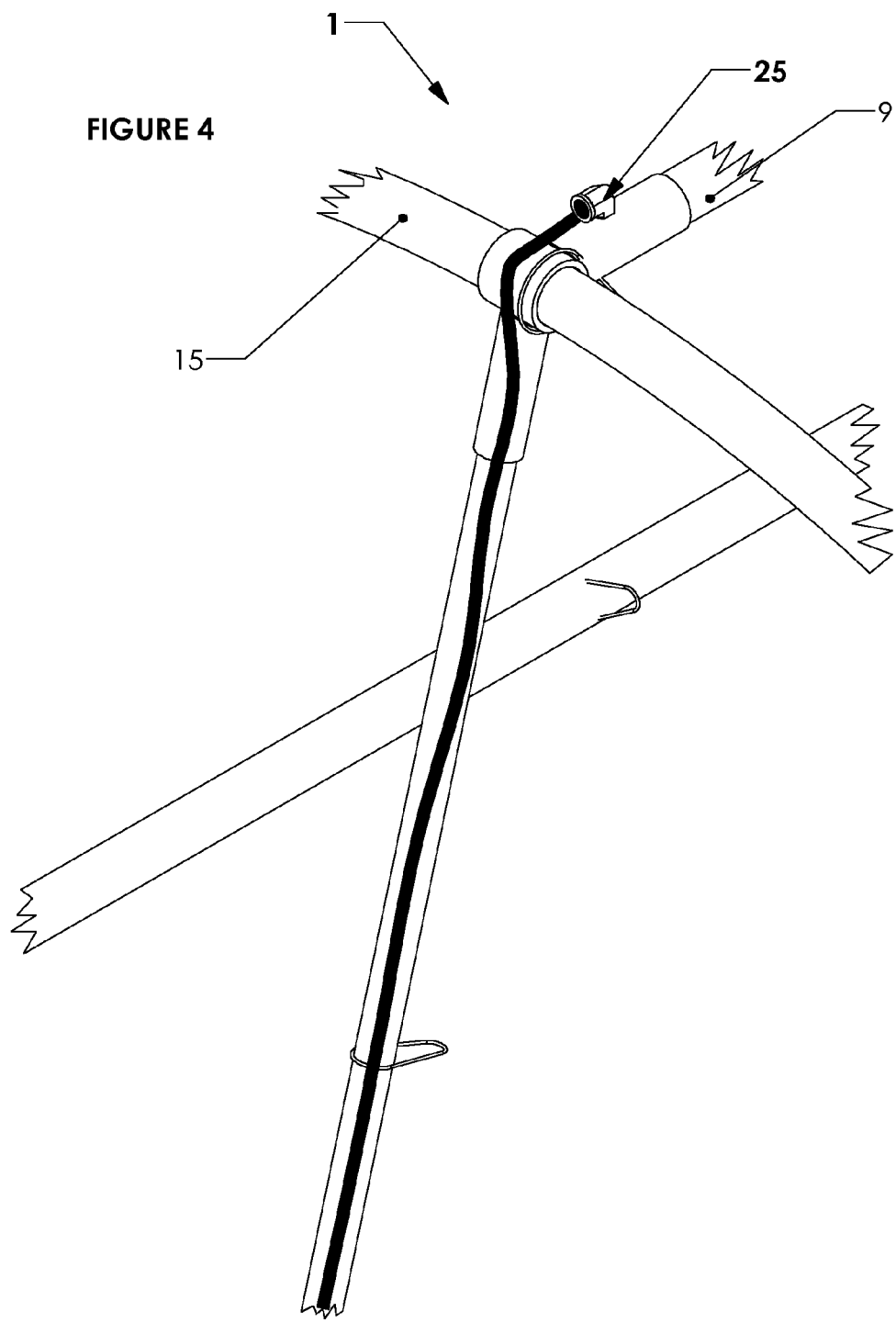
FIG. 4 is a perspective view of the valves near the intersection between cross-members and rims of the present invention.

As shown in FIG. 2, partially hollow cross-members (9) connect the first wheel (4) to the second wheel (10). In the event additional wheels are provided, the cross-members (9) can connect the additional wheels to one another or the first or second wheels (4, 10). The partially hollow cross-members (9) can be filled with gas or liquid to alter the overall buoyancy of the cage (1). This can be achieved, for example, by providing valves (25) at or near the intersection between the partially hollow rim (15) and the cross-members (9) (see FIG. 4). By providing valves (25) at or near the intersection between the partially hollow rim (15) and the cross-members (9), the buoyancy of each cross-member (9) can be controlled systematically and individually. Systemic control of the buoyancy of each cross-member (9) will permit the controlled rotation of the cage (1) while submerged. For example, for counter-clockwise rotation of the cage (1) shown in FIG. 2, those cross-members (9) identified by reference letters A, B, C and D, would be filled with a liquid, whereas cross-members E, F and G would be filled with a gas. When the cross-members (9) filled with gas (E, F and G) reach the upward and vertical position, the gas would be expelled from the cross-member (9) and replaced with a liquid with a density greater than or equal to environment in which the cage is submerged. Similarly, when the cross-members (9) filled with liquid (A, B, C and D) reach the downward and vertical position, the liquid would be expelled from the cross-member (9) and replaced with a gas having a density less than the environment in which the cage (1) is submerged.

In an alternate embodiment, propulsion means, such as jets (not shown), can be positioned along the cross-members (9) and systemically controlled to cause rotation of the cage (1) while submerged.

The buoyant structure (2) comprising the wheels (4, 10) and cross-members (9) is preferably made from an inherently buoyant material, such as high density polyethylene, or fibre reinforced plastic. However, it will be readily understood that the only criteria that needs to be met with respect to the buoyant structure is that it does automatically sink to the sea bed when submerged. Hollow aluminium tubes can also be used for the cross-members (9). Typically, the buoyant structure (2) is cylindrical in shape. However, many additional shapes can be envisaged using the elements of the buoyant structure, such as a dumbbell shaped structure.

As illustrated in FIG. 1 the netting (3) is positioned within the confines of the buoyant structure (2). Since the netting (3) is not stretched over the structure (2) itself there is less chance of the netting becoming worn or damaged by the structure (2). Preferred netting materials include, but are not limited to, Dyneema[7], Spectra[7] or other similar high performance polyethylene fibers. Conventional materials, such as rings and hooks, can be used to attach the netting (3) to the structure (2). However, the placement of the netting (3) within the confines of the structure (2) allows tension sensors (not shown) to be used to connect the netting (3) to the structure (2). These tension sensors can be used to detect any damage, such as a tear, that may have occurred to the netting (3). Alternatively, sensors can be integrated with or placed on the netting (3) to monitor the structural integrity of the netting (3). A collar (14) is located on each hub assembly (17) to fasten, secure and seal the cylindrical netting (3) to the hub assemblies (17) at each end of the central axle (7) (see FIG. 3).

The central axle (7) is attached at both ends to the wheels (4, 10) (FIG. 3) through the hub assembly (17). The central axle (7) is positioned centrally along the longitudinal axis of the interior of the netting (3). Accordingly, the central axle (7) can be provided as a partially hollow structure with one or more apertures to permit the introduction of services, such as food, air, liquid, therapeutics, data and power sources, to the interior of the netting (3). In addition, service lines can be attached to the central axle (7) through the hub assembly (17) thus allowing the remote introduction of such services. Furthermore, the central axle (7) can be attached to a vacuum line to capture the marine life during the harvesting process.

Figure 5:
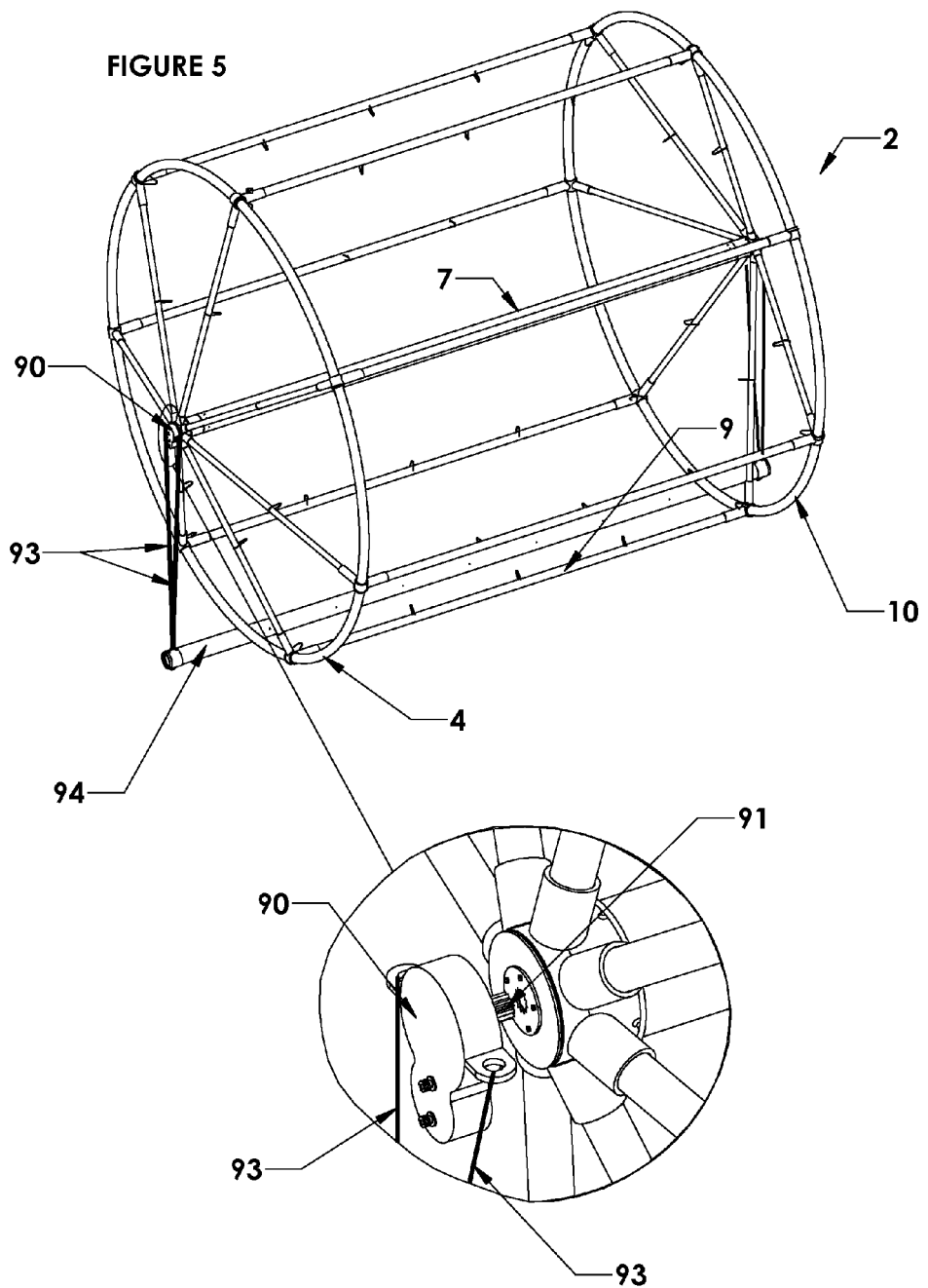
FIG. 5 is a perspective view of the motor attached to the hub assembly of the present invention.

The cage (1) of the present invention can also be rotating while in the submerged position through a motor (90), which can be connected to the hub assembly (17) of one or both of the first and second wheels (4, 10) (see FIG. 5). For example, a spline (91) driven by the motor (90) can interact with a corresponding spline hub (92) on the hub assembly (17) to cause rotation of the buoyant structure (2). During rotation, the motor (90) should be stably oriented with respect to the cage (1). One way this can be accomplished is by providing tethers (93) on the motor (90), which are attached to stabilizing beam or spreader bar (94) that extends the length of the buoyant structure (2).

Figure 6:
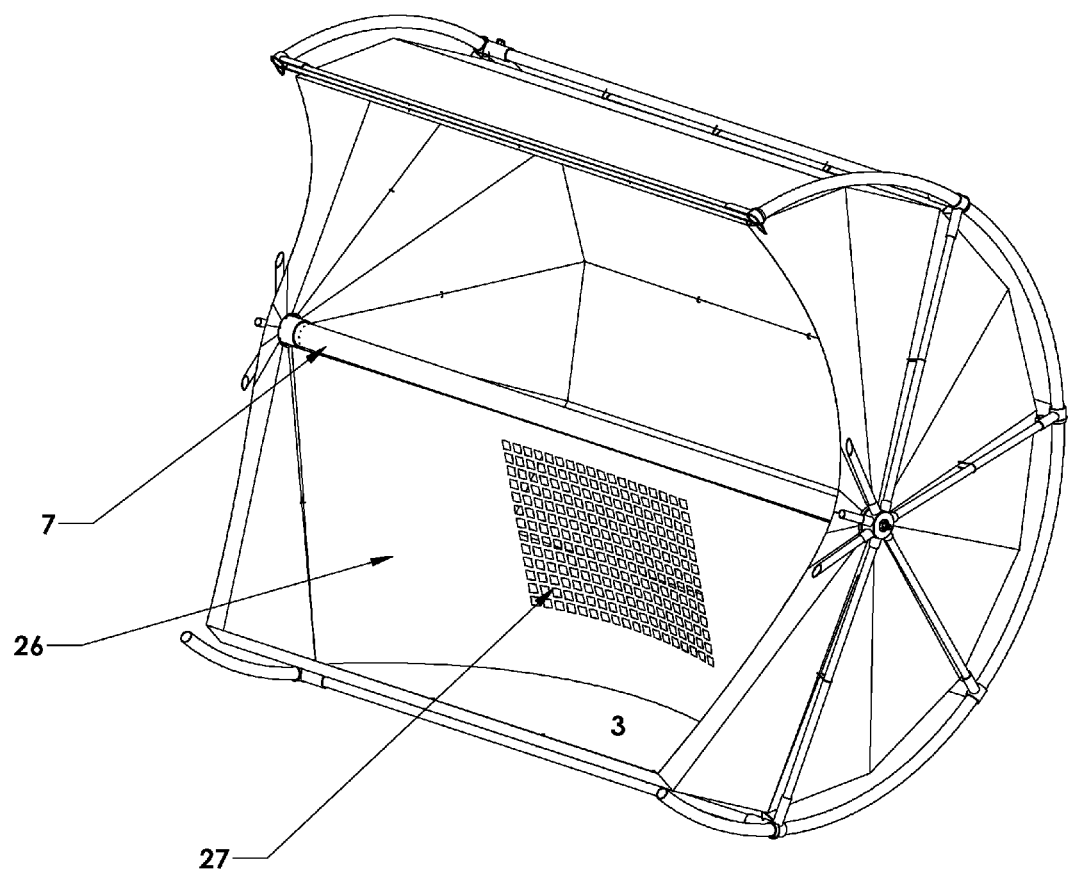
FIG. 6 is a cutaway view of the submersible cage according to an embodiment of the present invention.
Figure 7:
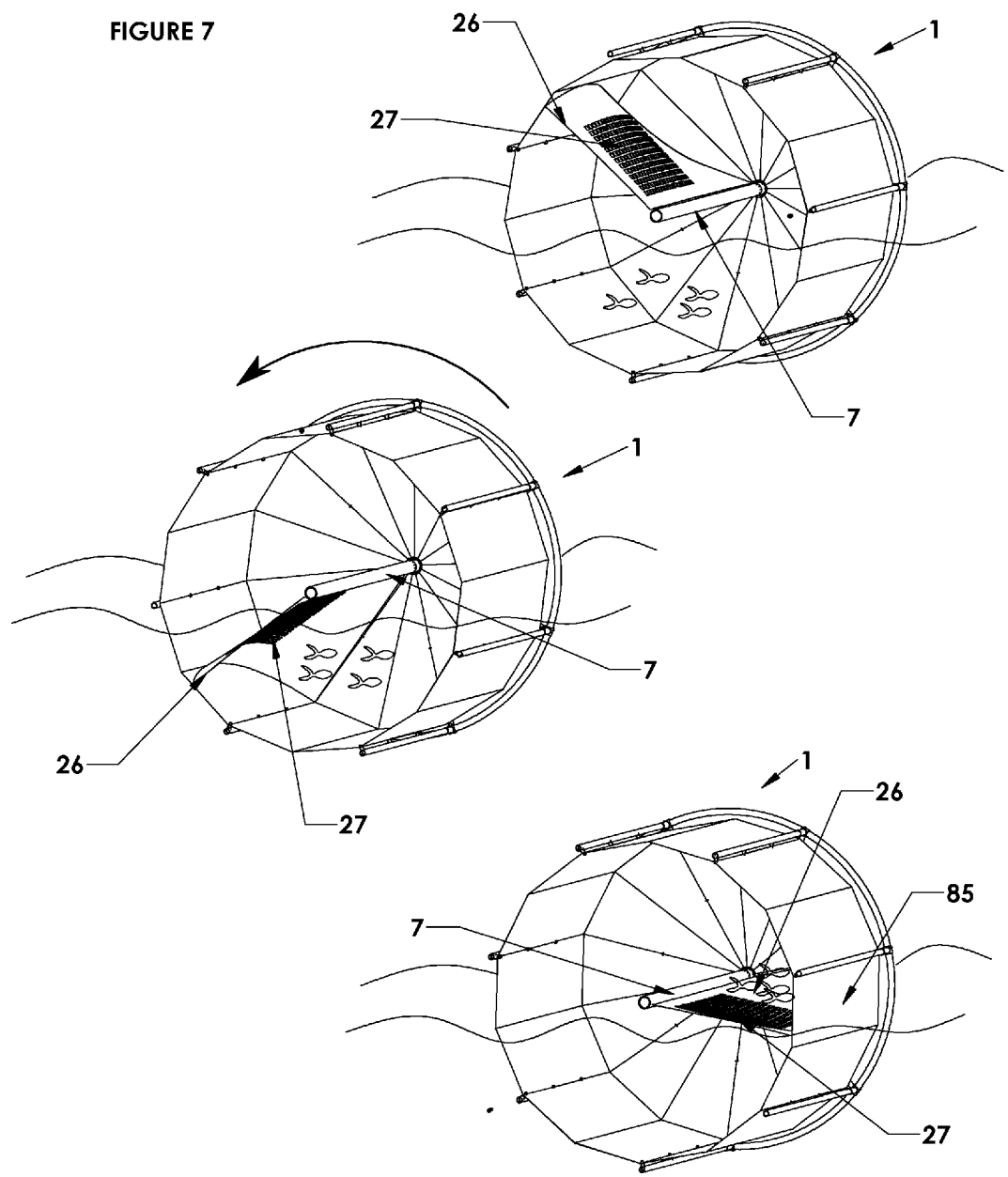
FIG. 7 is a cutaway view of the cage showing the rotation of the submersible cage according to an embodiment of the present invention.

FIG. 6 illustrates the sweep net (26) of the present invention. The sweep net (26) provides a barrier that extends radially from the central axle (7) to the netting (3). Typically, the sweep net (26) abuts the netting (3) along the longitudinal axis of the netting (3) or at an arc with respect to the longitudinal axis of the netting (3). Alternatively, the sweep net (26) can be arranged in a helical manner about the central axle, thus providing means to gather fish at one end of the netting (3) As shown in FIG. 7, rotation of the cage (1) about its central axle (7) collects the marine life contained in the sweep net (26). Furthermore, a grading panel (27) (FIG. 6) can be provided in the sweep net (26) to allow grading of the marine life while the sweep net (26) is being rotated. The grading panel (27) can be provided in a predetermined mesh size or can be provided as an adjustable panel depending on the application and data required.

Figure 8:
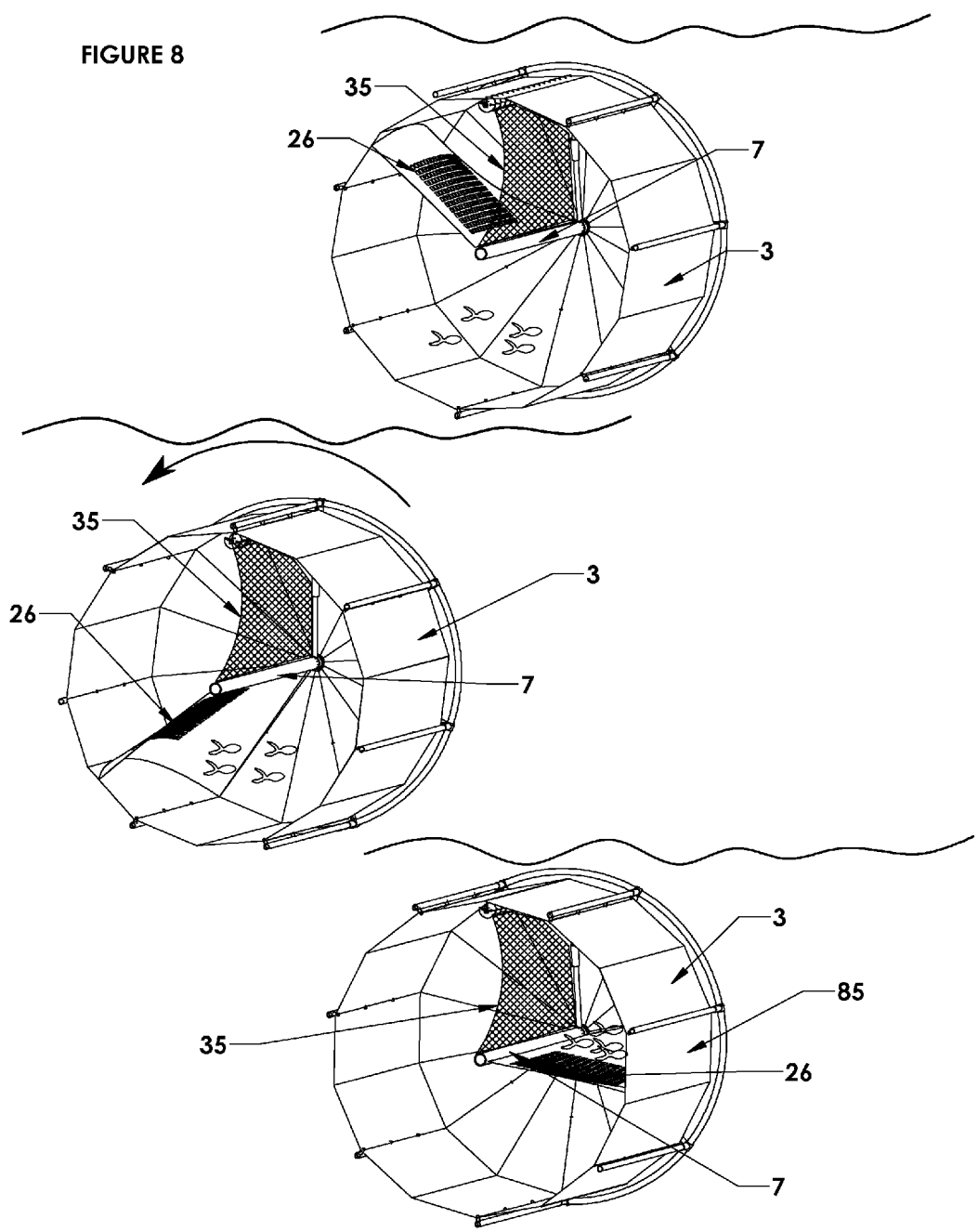
FIG. 8 is a cutaway view of the cage showing the rotation of the submersible cage according to another embodiment of the present invention.

The sweep net (26) can used either when the cage (1) is partially submerged or when the cage is fully submerged. As shown in FIG. 7, when the cage (1) is partially submerged, the surface of the water will act as a barrier to prevent the marine life from moving away from, and thus escaping, the sweep net (26). Alternatively, if the sweep net (26) is rotated in the fully submerged position, a physical barrier (35) must be provided in order for the sweep net to catch the marine life housed in the netting (3) (see FIG. 8). The physical barrier (35) can be a stationary net that also extends radially from the central axle (7) to the netting (3) or a wall of bubbles resulting from the expulsion of a gas from the central axle (7). In operation, the sweep net (26) will move in either a clockwise or counter-clockwise direction to a predetermined point where the marine life is trapped between the sweep net (26) and the physical barrier (35). A removable panel or door (85) is provided in the netting (3) to allow access to the gathered fish.

Figure 9:
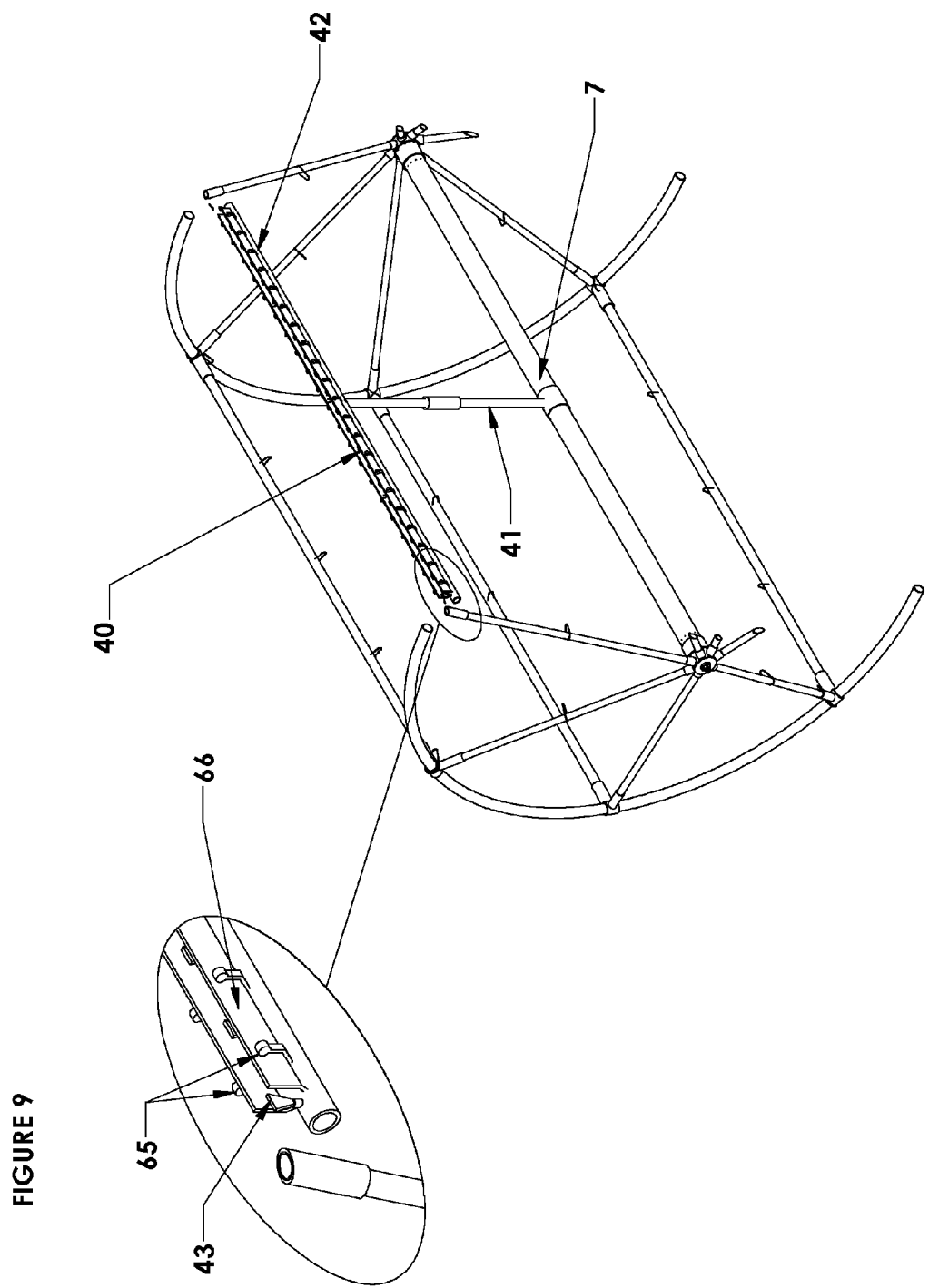
FIG. 9 is a perspective view of a net cleaning apparatus according to an embodiment of the present invention.

As shown in FIG. 9, the submersible cage (1) can be equipped with a net cleaning apparatus (40). The net cleaning apparatus (40) comprises an arm (41) extending radially from the central axle (7) and connected to a partially hollow cross-member (42), which extends wholly or partially the distance between the first and second wheels (4, 10). In an embodiment of the present invention, two positively buoyant arms (41) are connected to either end of the central axle (7) and the cross-member (42) connects the two positively buoyant arms (41) (see FIG. 9). The cross-member (42) is positioned in close communication with the netting (3) and contains a plurality of apertures (43) in which a fluid and/or a gas can be expelled towards the netting (3). Nozzles or jets can be used in conjunction with the apertures (43) to increase the pressure in which the liquid and/or gas is expelled from the cross-member (42), thus increasing the cleaning efficiency of the net cleaning apparatus (40).

In operation, the net cleaning apparatus (40) is activated by introducing pressurized gas and/or liquid through the cross-member (42) by either hoses connected to a remote source, or, by pressurized containers connected to the hub assembly (17) and/or the central axle (7) and channelled to the cross-member (42). The gas and/or liquid is expelled from the apertures (43) in the cross-member (42) towards the netting (3). Rotation of the buoyant structure (2), as described above, causes the netting (3) to be passed over the net cleaning apparatus (40) to effect cleaning of the netting (3). Alternately, the net cleaning apparatus (40) can be rotated within the netting (3) while the netting (3) is maintained in a stationary semi stationary position.

Figure 10:
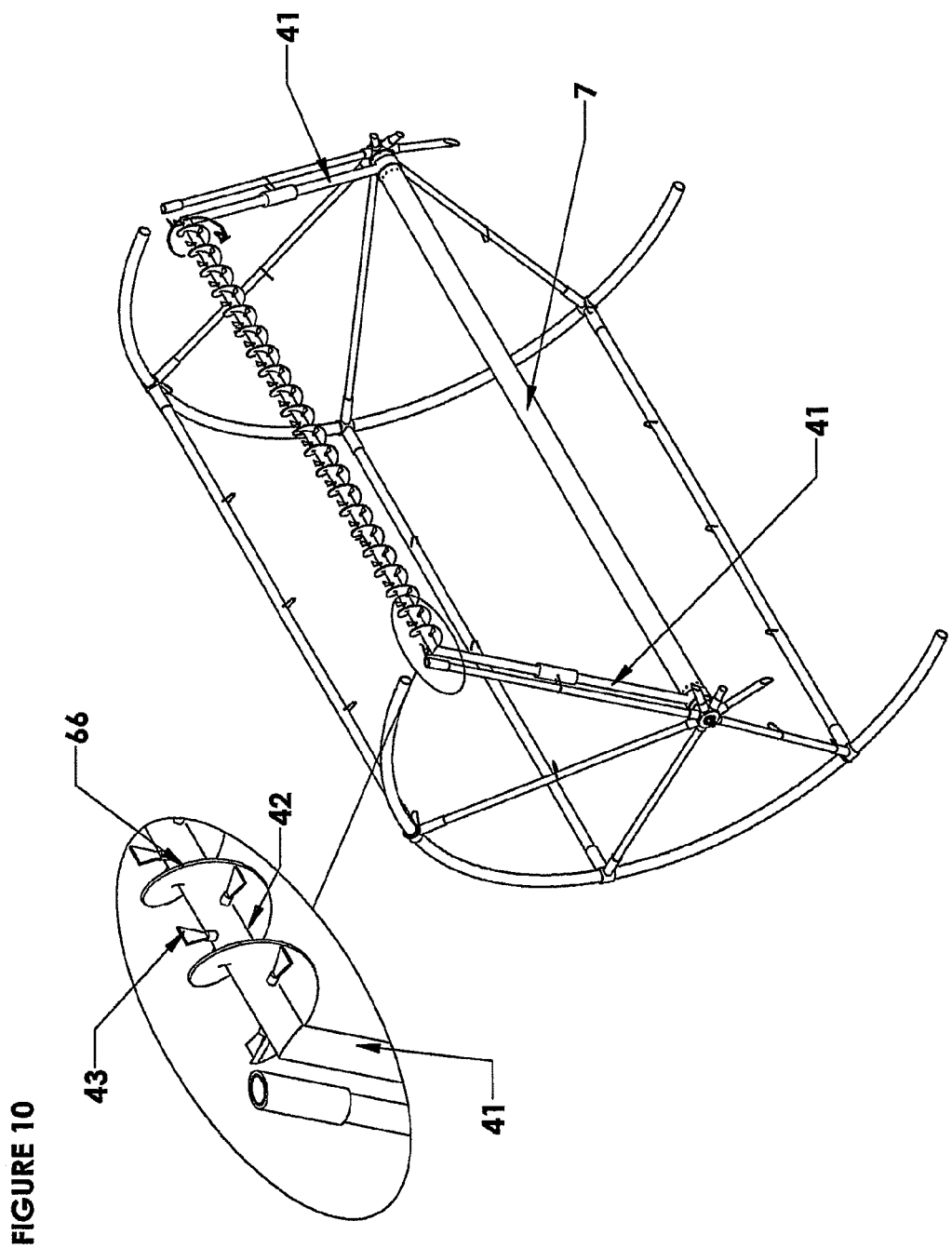
FIG. 10 is a perspective view of a net cleaning apparatus according to another embodiment of the present invention.

To assist in the cleaning of the netting (3) brushes (66) can be provided along the length of the cross-member (42). For example, the brushes (66) can be arranged as a helix over the surface of the cross-member (42) with the apertures (43) also arranged helically interspersed between the helical turns of the brushes (66) (see FIG. 10). In this arrangement, it is preferable, that the cross-member (42) is rotatable with respect to the arms (41), in order to allow effective scrubbing and cleaning of the netting (3) as it is passed over the net cleaning apparatus (40). In addition to the brushes (66) provided on cross-member (42), brushes can also be provided on the arms (41) to effect cleaning of the ends walls of the netting (3) (not shown).

In order to limit the possibility of the netting (3) from becoming entangled with the cross-member (42) of the net cleaning apparatus (40), guides (65) can be provided in conjunction with the cross-member (42) that will maintain the netting (3) at a safe distance from the cross-member (42).

Although it is preferred that the arms (41) are positively buoyant, so that the arms (41) are positioned upward and vertical, the arms (41) could be fixed to the central axle (7) and positioned in any direction within the buoyant structure (2). Furthermore, the physical barrier (35) described above could be attached to the central axle (7), arms (41) and cross-member (42).

The architecture and features of the cage (1) allow for all or most tasks associated with fish farming to be executed while of the cage (1) is submerged. For example, the ability of the cage (1) to rotate under water permits most tasks that are normally conducted with a cage in a partially submerged or surfaced state to be conducted while the cage (1) is submerged. In conjunction with the net cleaning apparatus (40), rotation of the cage (1) permits effective cleaning of the netting (3) without having to bring the cage to the surface or use divers to clean the cage (1). Furthermore, when the cage (1) is equipped with the sweep net (26) described above, all of the inhabitants of the cage (1) can be graded, counted and/or harvested while the cage (1) is submerged.

The architecture and features of the cage (1) also allow for the cage to act as a biomass information gathering interface.

Figure 11:
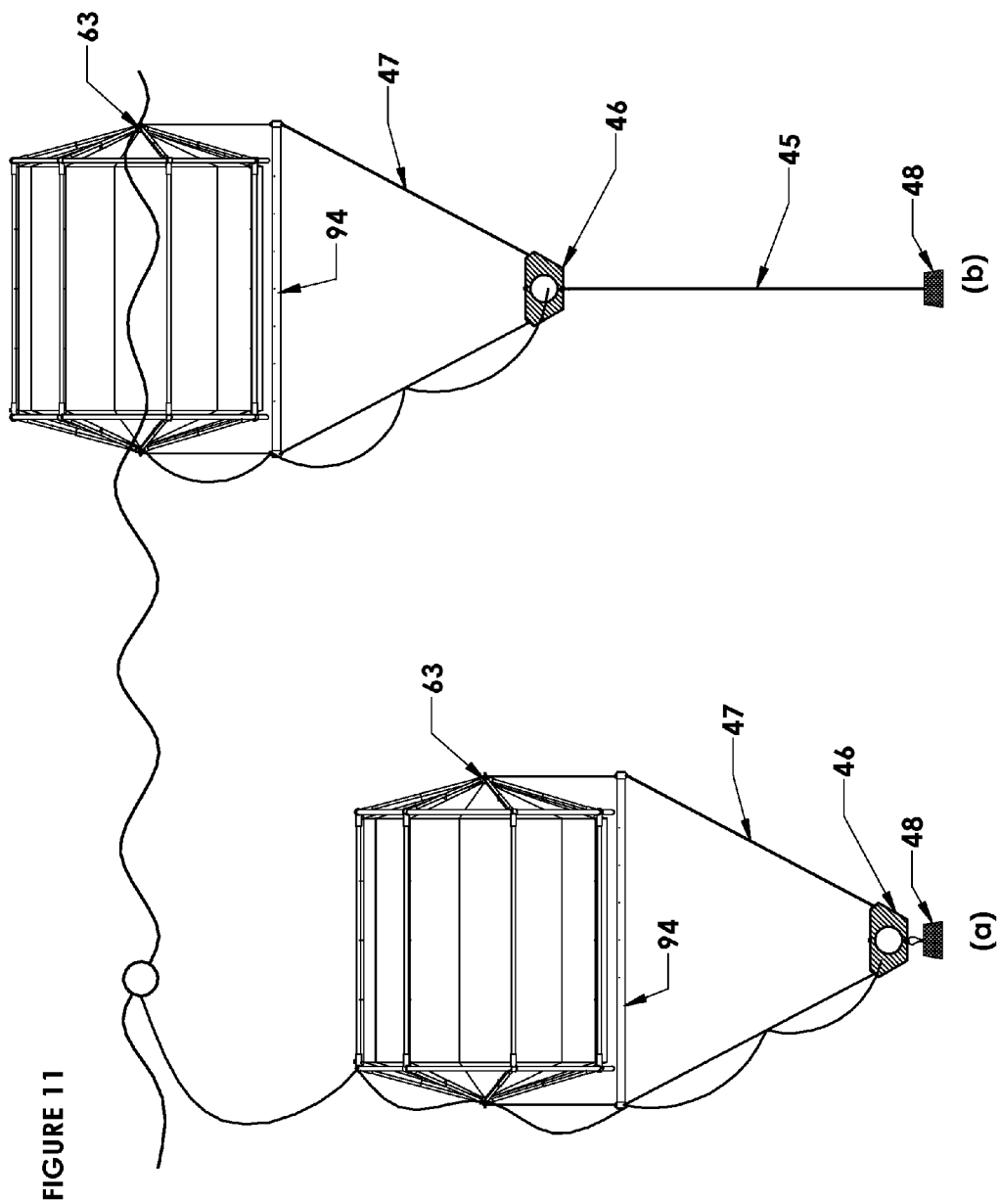
FIG. 11 shows the submersible cage in the A) submerged position and B) surfaced position according an embodiment of the present invention.

FIG. 11 shows a cage (1) submerged (FIG. 10a) and on the surface (FIG. 10b) connected by a single line tethering system (45). Ascent and decent of the cage (1) occurs by a winch (46). The winch (46) is preferably a hydraulic winch. The winch (46) is mounted below the cage on a fastening sling (47). The ends of the fastening sling (47) that attach to the cage (1) are connected by an outer bearing attachment point (63) on each hub assembly (17). The use of bearing attachment points (63) prevent the twisting of the fastening sling (47) when the cage (1) is rotated. The weight of the anchor (48) has to be sufficient to hold the cage (1) at a constant depth even if the partially hollow rims (15) are completely filled with gas.

FIG. 12a shows a single point mooring system wherein a controllable buoyancy element (49) is used to control the depth of the cage (1) with respect to the environment in which the cage (1) is positioned. The controllable buoyancy element (49) is positioned along a tethering line (53) that is connected at one end to a fastening sling (47) and at the other end a mooring point (52). The tethering line (53) travels through a pulley (51) towards the mooring point (52). Positioned along the tethering line (53) between the pulley (51) and the mooring point (52) is the controllable buoyancy element (49). Gas can be introduced into a hose extending from a buoy (50) on the surface to the controllable buoyancy element (49). As a result the controllable buoyancy element (49) rises towards the surface and pulls with it the tethering line (53), which causes the cage (1) to be pulled towards the pulley (51).

FIG. 12b shows the same single mooring system as shown in FIG. 12a wherein a controllable buoyancy element (49) is used to control the depth of the cage (1) with respect to the environment in which the cage (1) is positioned. In this case, liquid is introduced into the hose extending from the buoy (50) to the controllable buoyancy element (49). The density of the liquid causes the controllable buoyancy element (49) to sink towards the seabed and thus removing the tension in the tethering line (53), resulting in the movement of the cage (1) towards the surface. In addition, gas can be introduced into the buoyant structure (2) to assist in the upward movement, or surfacing, of the cage (1).

FIG. 13 illustrates a possible arrangement of the cage (1) within a larger support frame (70). The cage (1) is held in place within the larger support frame (70) by mooring lines (64) connected to mooring structures (71) positioned at the corners of the support frame (70). The support frame (70) provides support to the cage (1) in order to limit the horizontal movement of the cage (1) during changes in the environment wherein the cage (1) is placed.

Figure 14:
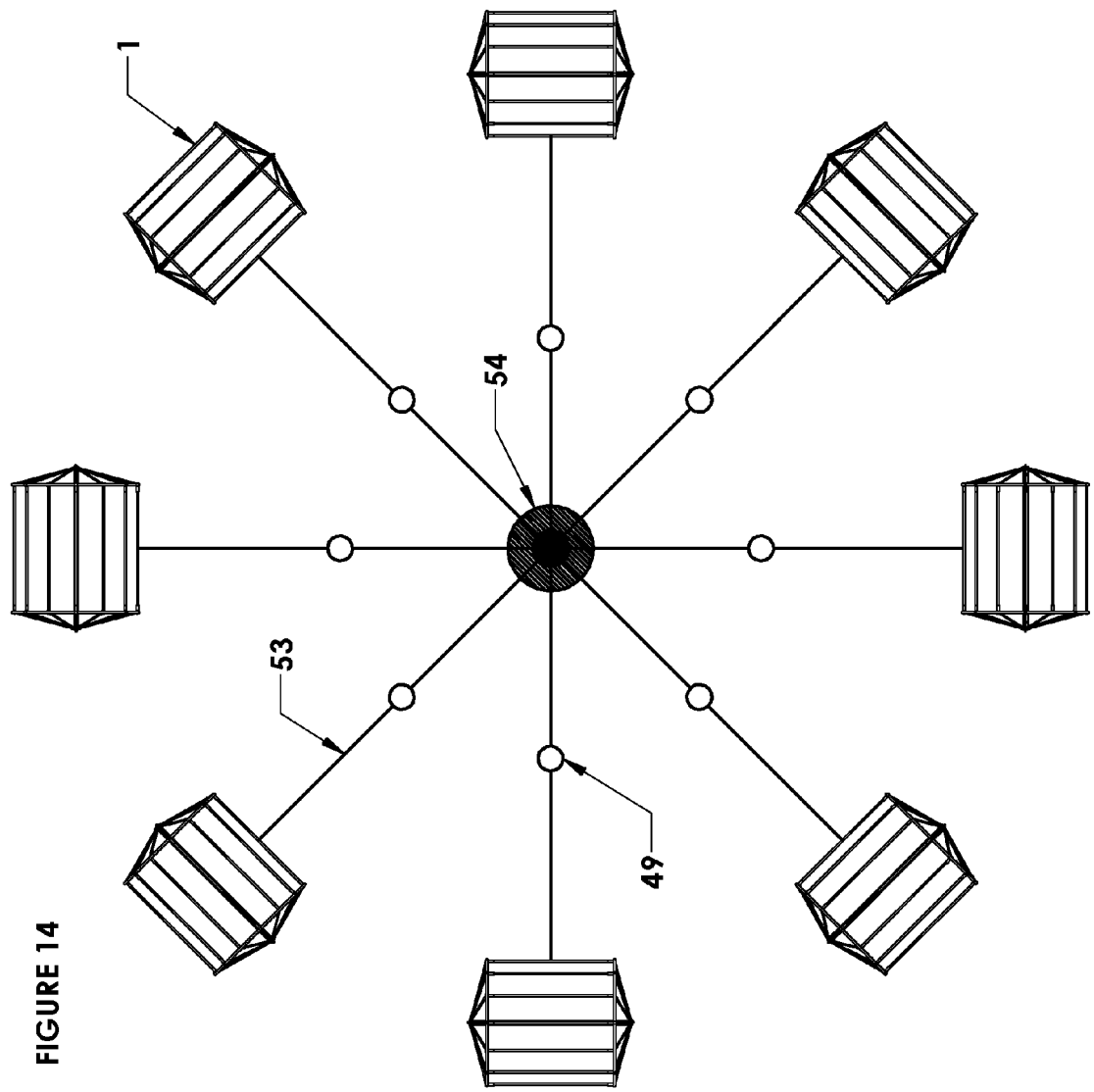
FIG. 14 shows a possible arrangement for the submersible cages of the present invention in a fish farm.

FIG. 14 shows a possible arrangement of several cages using the mooring systems shown in FIGS. 9a and 9b. In the arrangement shown in FIG. 14 an anchor (54) forms the center of a formation of several cages (1) in a fish farm. In this particular embodiment, eight cages (1) are linked in a star pattern. Multiple tethering lines (53) are controlled by a one or more controllable buoyancy elements (49). The cages (1) are raised and lower in accordance to the method described above. The cages (1) are located in at a suitable distance from the center and from other cages (1) in the formation to avoid collisions and possible entanglement of two or more cages. FIG. 15 shows another possible arrangement of several cages using a modified version of the mooring system shown in FIGS. 9a and 9b. In particular, FIG. 15a illustrates how two cages (1) can be connected to a single mooring point (52). As shown in FIG. 15b, this arrangement allows for several sets of cages (1) to be aligned in a manner that increases the number of cages per surface area occupied.

Figure 16:
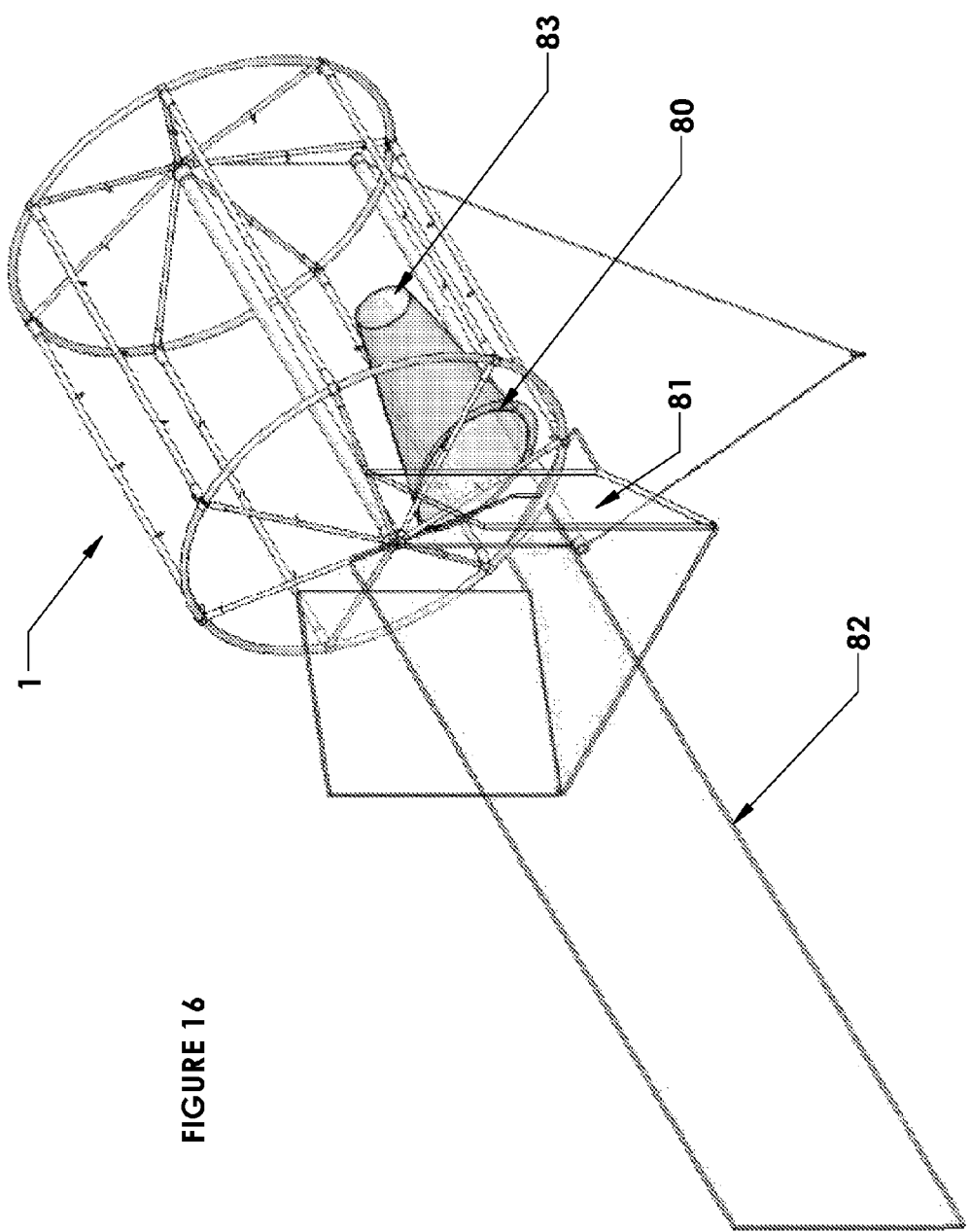
FIG. 16 shows the submersible cage of the present invention adapted to be used as a fish trapping device.

The cage (1) of the present invention can be adapted to be used as a trap for catching fish. An opening (80) is introduced in the netting (3) and a trapping entrance (81) is mounted on the cage (1) at the opening (80). The trapping entrance (81) is preferably funnel shaped. Suitable guiding means (82) are preferably attached to the trapping entrance (81) to guide the aquatic animals towards and into the cage (1). The guiding means (82) of the present invention is preferably a guiding net, which extends from the trapping entrance (81) at a certain angle outwardly from the cage (1) (see FIG. 16). In one embodiment, a sizing exit (83) in introduced opposite the trapping entrance (81). The sizing exit (83) in a net structure with meshes of certain size for selecting only aquatic animals over a certain size and permitting smaller animals, which swim in a straight direction from the trapping entrance (81) pass through.

The present invention has been described with regard to preferred embodiments. However, it will be obvious to persons skilled in the art that a number of variations and modifications can be made without departing from the scope of the invention as described herein.

We claim:

1. A device for cleaning of a netting of a submersible cage having a central axle, said device comprising:
   at least one positively buoyant arm extending radially from the central axle toward the netting; and
   a partially hollow linear cross-member having a longitudinal axis and attached to said arm and extending generally parallel to the central axle,
   wherein a plurality of apertures are positioned along the cross-member to allow expulsion of air or fluid from the cross-member towards the netting.

2. The device according to claim 1, wherein two positively buoyant arms are connected to either end of the central axle and the partially hollow cross-member interconnects the two positively buoyant arms.

3. The device according to claim 1, further comprising nozzles or jets in operable communication with the apertures to assist in the expulsion of air or fluid from the crossmember.

4. The device according to claim 1, wherein brushes are attached to crossmember and contact the netting to facilitate cleaning of the netting.

5. The device according to claim 4, wherein the brushes are attached to the central axle in a helical arrangement and the apertures are interspersed between the helical turns of the brushes.

6. The device according to claim 1, wherein the cross-member is rotatable with respect to the positively buoyant arms.

7. The device according to claim 1, further comprising guides connected to the cross-member for maintaining the netting at a safe distance away from the crossmember.

* * * * *